US012672737B2

(12) United States Patent
Harvieux

(10) Patent No.: US 12,672,737 B2
(45) Date of Patent: Jul. 7, 2026

(54) PAN/POT PROTECTOR AND HOT PAD

(71) Applicant: David Harvieux, Canandaigua, NY (US)

(72) Inventor: David Harvieux, Canandaigua, NY (US)

( * ) Notice: Subject to any disclaimer, the term of this patent is extended or adjusted under 35 U.S.C. 154(b) by 0 days.

(21) Appl. No.: 19/055,728

(22) Filed: Feb. 18, 2025

(65) Prior Publication Data

US 2025/0261790 A1     Aug. 21, 2025

Related U.S. Application Data

(60) Provisional application No. 63/555,490, filed on Feb. 20, 2024.

(51) Int. Cl.
*A47J 36/36*          (2006.01)
(52) U.S. Cl.
CPC ..................................... *A47J 36/36* (2013.01)
(58) Field of Classification Search
CPC ....... A47J 27/00; A47J 36/36; B65D 81/3876; B65D 81/3886; B65D 81/38; B65D 81/3874; B65D 81/3823
USPC .. 220/573.1, 912, 739, 737, 592.26, 592.22, 220/592.2; 150/165
See application file for complete search history.

(56) References Cited

U.S. PATENT DOCUMENTS 218,187 A   *   8/1879   Mills ........................ A47J 36/36
                                                             220/592.12
2,010,812 A   *   8/1935   Devine .............. B65D 81/3886
                                                             220/592.2

2,490,250 A   *   12/1949   Boener ................... A47J 27/00
                                                              150/165
6,513,683 B1 *   2/2003   Kull ....................... A47G 19/14
                                                              220/916
2008/0099363 A1    5/2008   Orbach
2008/0302693 A1   12/2008   Albert
2013/0327457 A1 *   12/2013   Mark .................... A47J 27/004
                                                              150/165

FOREIGN PATENT DOCUMENTS

EP          1039211 A2  *   9/2000   ................ F17C 3/04

OTHER PUBLICATIONS https://www.instructables.com/Easy-and-Stylish-Fabric-Pan-Protectors/ Oct. 23, 2023.

(Continued)

*Primary Examiner* — Robert J Hicks
(74) *Attorney, Agent, or Firm* — Michael J. Nickerson

(57)          ABSTRACT

A pan/pot protector and hot pad includes a first compound fabric constructed of a first layer of non-abrasive, durable fabric, a second layer of non-abrasive, durable fabric, and a first insulative thermal barrier batting located between the first and second layers of non-abrasive, durable fabric; and a second compound fabric constructed of a third layer of non-abrasive, durable fabric, a fourth layer of non-abrasive, durable fabric, and a second insulative thermal barrier batting located between the third and fourth layers of non-abrasive, durable fabric. The first compound fabric is operatively attached to the second compound fabric. The attachment of the first compound fabric and the second compound fabric is configured to have a shape to effectively provide a volume for receiving and protectively covering an entire pot/pan.

10 Claims, 14 Drawing Sheets

<u>100</u>

(56)     References Cited

OTHER PUBLICATIONS https://www.ebay.co.uk/itm/JML-Heat-Resistant-Felt-Pan-Protector-Set-of-2-in-Red-Black-/172996667127 Oct. 23, 2023.
https://www.amazon.com/yekoo-neoprene-dual-function-protection-resistant/dp/B078MM8J3B/ref=sr_1_4?th=1 Oct. 23, 2023.

* cited by examiner

100

110

140

120

119

116

113

129

126

123

150

2000

PAN/POT PROTECTOR AND HOT PAD

PRIORITY INFORMATION

This application claims priority from U.S. Provisional Patent Application, Ser. No. 63/555,490, filed on Feb. 20, 2024. The entire content of U.S. Provisional Patent Application, Ser. No. 63/555,490, filed on Feb. 20, 2024, is hereby incorporated by reference.

BACKGROUND

High-end cookware, bakeware, and serveware have coatings that are susceptible to damage when the cookware, bakeware, and serveware are banged together during storage. Damaging the coating of the high-end cookware, bakeware, and serveware can negatively affect the heating and/or non-stick functions of the high-end cookware, bakeware, and serveware.

One conventional solution to reducing damage to the coating of the high-end cookware, bakeware, and serveware is to provide a fabric or plastic/rubber sheet for inserting between high-end cookware, bakeware, and serveware when stacking the cookware, bakeware, and serveware.

For example, a high-end pot is placed on a shelf, a fabric or plastic/rubber sheet is then placed on top of the high-end pot, and then another high-end pot is placed on top of the fabric or plastic/rubber sheet, such that the fabric or plastic/rubber sheet is located between the two high-end pots.

However, the conventional fabric or plastic/rubber sheet does not fully protect the high-end pot/pan because the fabric or plastic/rubber sheet does not fully enclose the high-end pot/pan.

Moreover, the conventional fabric or plastic/rubber sheet only provides one function, protecting a portion of the high-end pot/pan.

Lastly, the conventional fabric or plastic/rubber sheet does not fully protect the high-end pot/pan when the high-end pot/pan is being transported because the fabric or plastic/rubber sheet does not fully enclose the high-end pot/pan.

Another example of a conventional pan protective cover is disclosed in Published US Patent Application Number 2008/0099363. Published US Patent Application Number 2008/0099363 discloses protective cover for a pan that is formed of two layers of fabric material. The fabric material is formed with an opening to receive the pan and a notch to allow a handle to pass therethrough. The opening includes a tie to close the opening allowing the protective cover to form a surface above the pan upon which another pan can be placed without directly contacting the bottom pan.

However, Published US Patent Application Number 2008/0099363 does not disclose that the pan protector is heat resistant.

The entire content of Published US Patent Application Number 2008/0099363 is hereby incorporated by reference.

A further example a conventional pan protective cover is disclosed in Published US Patent Application Number 2008/0302693. Published US Patent Application Number 2008/0302693 discloses protective cover for a pan that is formed of multiple layers of fabric material to produce stacked pockets, each pocket is configured to receive a pan. The fabric material is formed with openings to receive a pan. Each opening includes a tie to close the opening.

However, Published US Patent Application Number 2008/0302693 does not disclose that the pan protector is heat resistant. Moreover, Published US Patent Application Number 2008/0302693 does not disclose that the stacked configuration can be used as a hot pad for placing a hot pan on without damaging the underlying surface.

The entire content of Published US Patent Application Number 2008/0302693 is hereby incorporated by reference.

As demonstrated above, a conventional pan protective cover fails to provide a sufficient protection to the pan to be protective and fails to provide heat resistant so that the pan protective cover can be utilized as a hot pad for placing a hot pan on without damaging the underlying surface.

Thus, it is desirable to provide a pan/pot protector that fully protects cookware, bakeware, or serveware.

Moreover, it is desirable to provide a pan/pot protector that provides a hot pad function.

Additionally, it is desirable to provide a pan/pot protector that provides a hot pad function in addition to fully protecting the cookware, bakeware, or serveware.

BRIEF DESCRIPTION OF THE DRAWINGS

The drawings are only for purposes of illustrating various embodiments and are not to be construed as limiting, wherein.

DETAILED DESCRIPTION OF THE DRAWINGS

Figure 1:
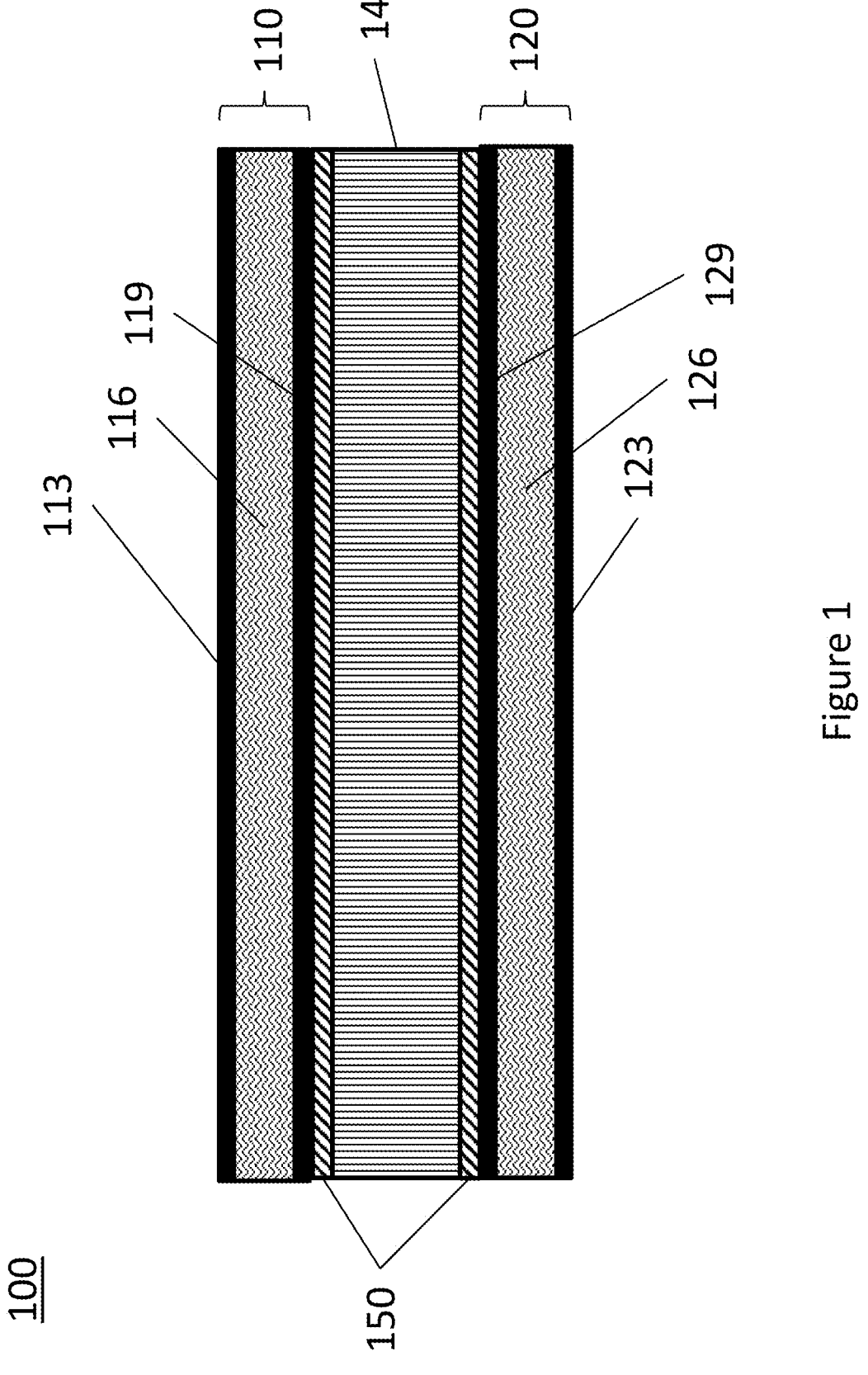
FIG. 1 illustrates a first side view of an expanded pan/pot protector and hot pad.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated FIG. 1 illustrates a first side view of an expanded pan/pot protector and hot pad. As illustrated in FIG. 1, the pan/pot protector and hot pad 100 includes a first compound fabric 110, a second compound fabric 120, and a side fabric 140.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second compound fabric 120 may be constructed of layers of non-abrasive, durable fabric (123 and 129) with an insulative batting (thermal barrier) 126 between the layers of non-abrasive, durable fabric (123 and 129). The second compound fabric 120 may have a square shape, a circular shape, a triangular shape, or any other shape that effectively provides a volume for receiving a pot/pan and/or covering for protecting the pot/pan.

In an alternative embodiment, the first compound fabric 110 is constructed of layers of non-abrasive, durable fabric (113 and 119) with an insulative batting (thermal barrier) 116 between the layers of non-abrasive, durable fabric (113 and 119), and the second compound fabric 120 is constructed of a thick layer of non-abrasive, durable fabric or layers of non-abrasive, durable fabric (123 and 129) with no insulative batting (thermal barrier) therebetween.

With respect to describing the pan/pot protector and hot pad 100 of FIG. 1, the description of the pan/pot protector and hot pad 100 assumes that the first compound fabric 110 and the second compound fabric 120 have a square shape and the first compound fabric 110 and the second compound fabric 120 each have four edges, wherein three of the edges are sewn (attached) to side fabric 140.

As illustrated in FIG. 1, a first edge of the first compound fabric 110 and a first edge of the second compound fabric 120 are attached together by the side fabric 140 to form corners 150, wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Figure 2:
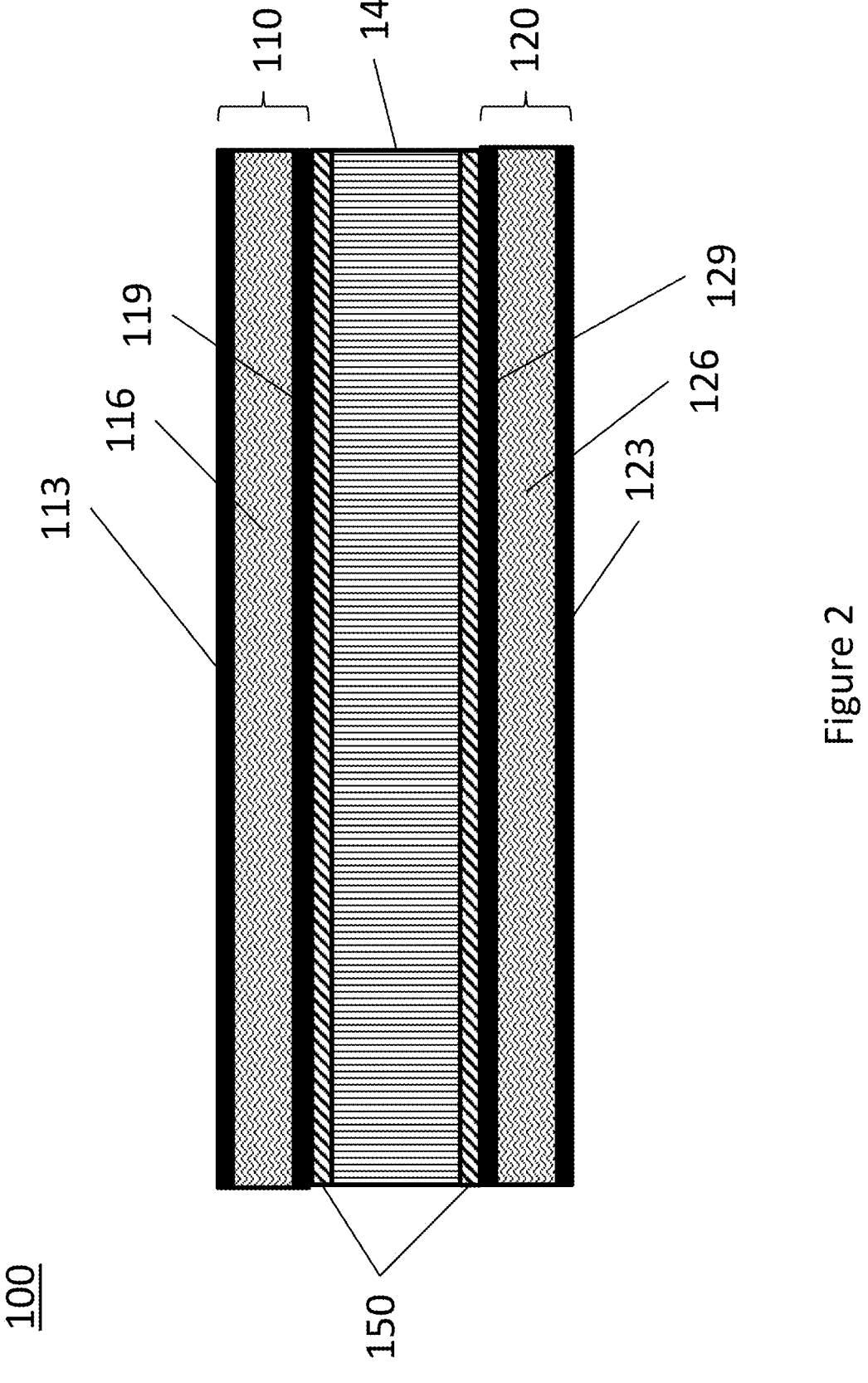
FIG. 2 illustrates a second side view of the expanded pan/pot protector and hot pad of FIG. 1.

FIG. 2 illustrates a second side view of an expanded pan/pot protector and hot pad. As illustrated in FIG. 2, the pan/pot protector and hot pad 100 includes a first compound fabric 110, a second compound fabric 120, and a side fabric 140.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second compound fabric 120 may be constructed of layers of non-abrasive, durable fabric (123 and 129) with an insulative batting (thermal barrier) 126 between the layers of non-abrasive, durable fabric (123 and 129). The second compound fabric 120 may have a square shape, a circular shape, a triangular shape, or any other shape that effectively provides a volume for receiving a pot/pan and/or covering for protecting the pot/pan.

In an alternative embodiment, the first compound fabric 110 is constructed of layers of non-abrasive, durable fabric (113 and 119) with an insulative batting (thermal barrier)

116 between the layers of non-abrasive, durable fabric (113 and 119), and the second compound fabric 120 is constructed of a thick layer of non-abrasive, durable fabric or layers of non-abrasive, durable fabric (123 and 129) with no insulative batting (thermal barrier) therebetween.

With respect to describing the pan/pot protector and hot pad 100 of FIG. 2, the description of the pan/pot protector and hot pad 100 assumes that the first compound fabric 110 and the second compound fabric 120 have a square shape and the first compound fabric 110 and the second compound fabric 120 each have four edges, wherein three of the edges are sewn (attached) to side fabric 140.

As illustrated in FIG. 2, a second edge of the first compound fabric 110 and a second edge of the second compound fabric 120 are attached together by the side fabric 140 to form corners 150, wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Figure 3:
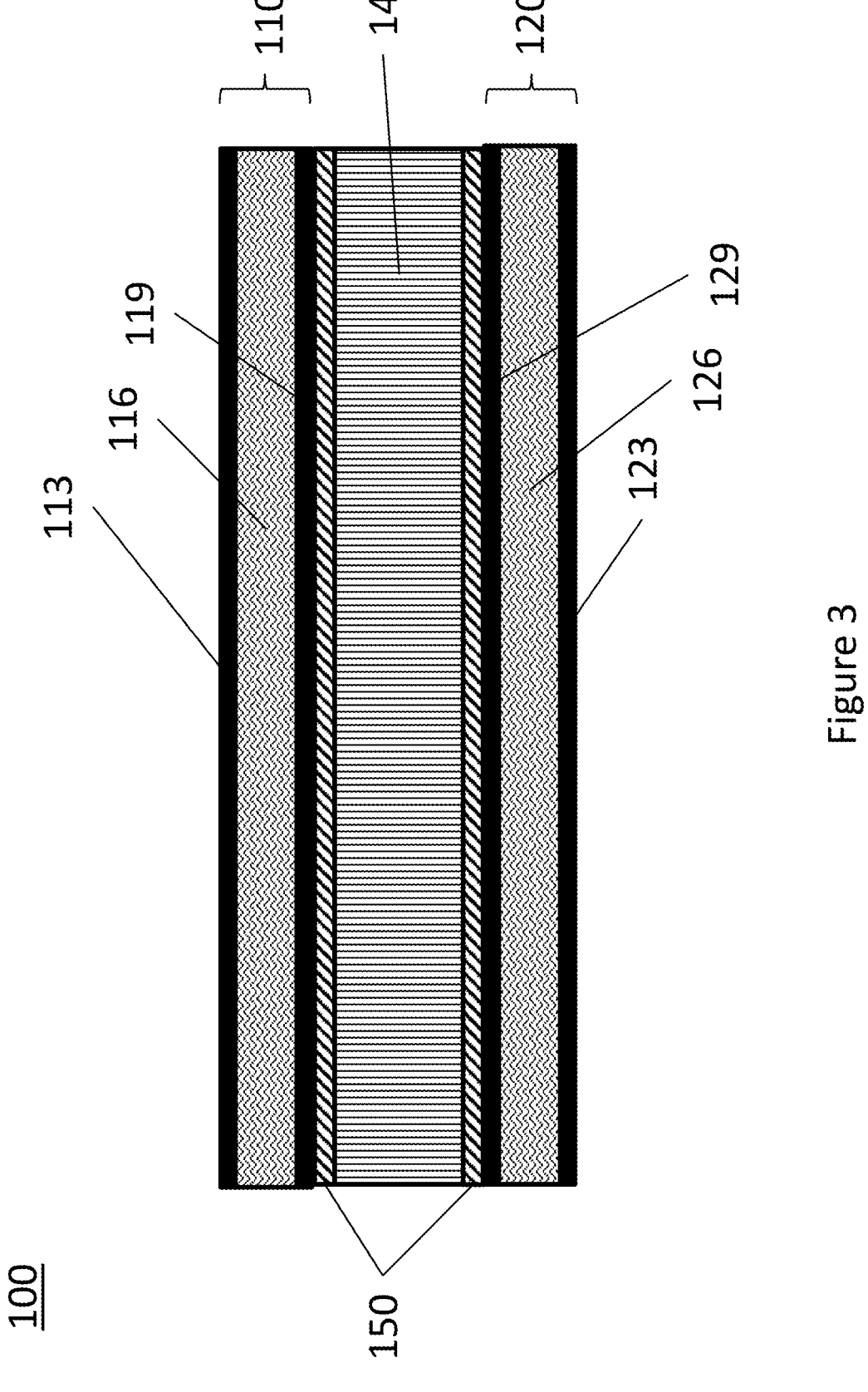
FIG. 3 illustrates a back view of the expanded pan/pot protector and hot pad of FIG. 1.

FIG. 3 illustrates a back view of an expanded pan/pot protector and hot pad. As illustrated in FIG. 3, the pan/pot protector and hot pad 100 includes a first compound fabric 110, a second compound fabric 120, and a side fabric 140.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second compound fabric 120 may be constructed of layers of non-abrasive, durable fabric (123 and 129) with an insulative batting (thermal barrier) 126 between the layers of non-abrasive, durable fabric (123 and 129). The second compound fabric 120 may have a square shape, a circular shape, a triangular shape, or any other shape that effectively provides a volume for receiving a pot/pan and/or covering for protecting the pot/pan.

In an alternative embodiment, the first compound fabric 110 is constructed of layers of non-abrasive, durable fabric (113 and 119) with an insulative batting (thermal barrier) 116 between the layers of non-abrasive, durable fabric (113 and 119), and the second compound fabric 120 is constructed of a thick layer of non-abrasive, durable fabric or layers of non-abrasive, durable fabric (123 and 129) with no insulative batting (thermal barrier) therebetween.

With respect to describing the pan/pot protector and hot pad 100 of FIG. 3, the description of the pan/pot protector and hot pad 100 assumes that the first compound fabric 110 and the second compound fabric 120 have a square shape and the first compound fabric 110 and the second compound fabric 120 each have four edges, wherein three of the edges are sewn (attached) to side fabric 140.

As illustrated in FIG. 3, a back edge of the first compound fabric 110 and a back edge of the second compound fabric 120 are attached together by the side fabric 140 to form corner 150, wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Figure 4:
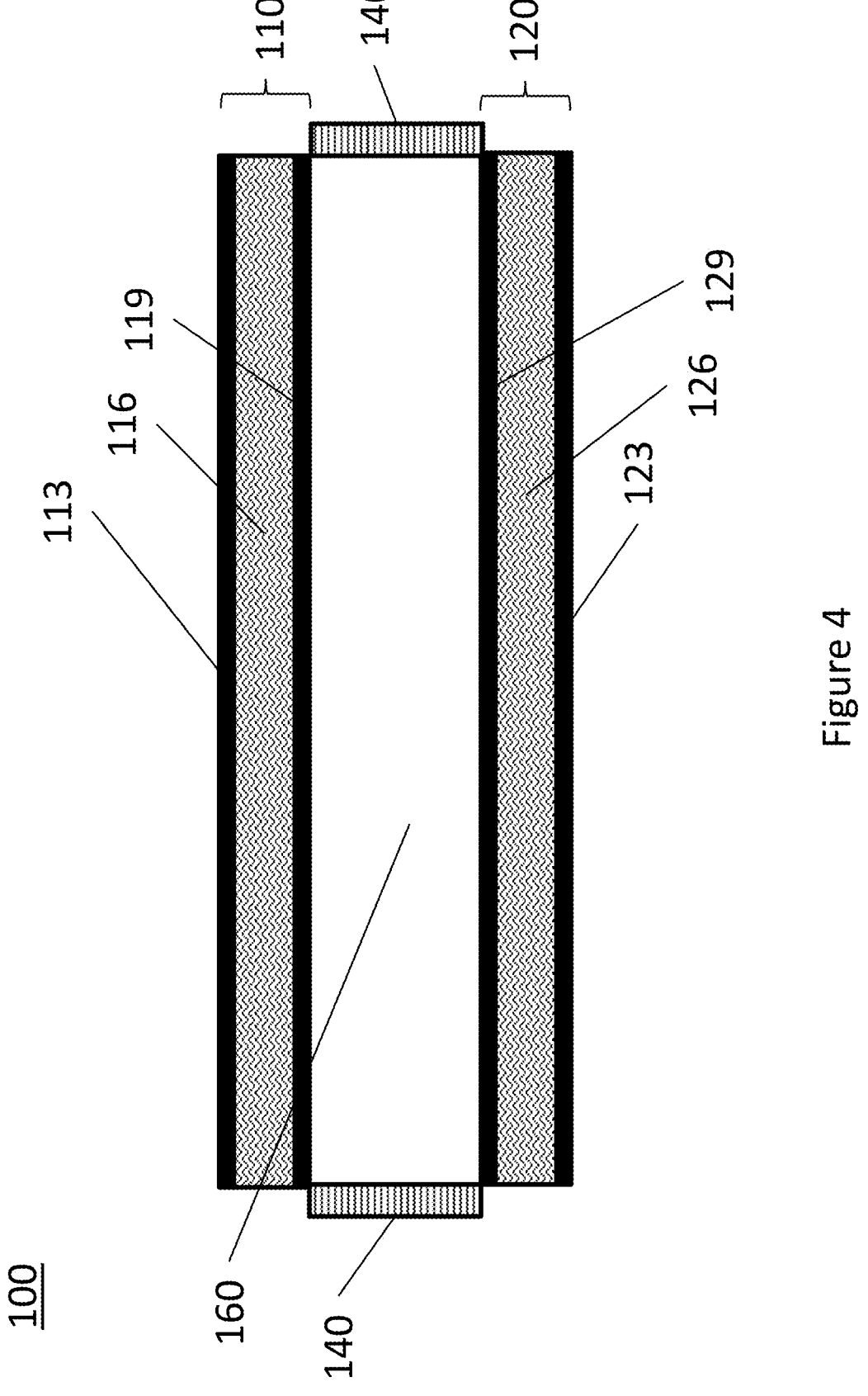
FIG. 4 illustrates a front view of the expanded pan/pot protector and hot pad of FIG. 1.

FIG. 4 illustrates a front view of an expanded pan/pot protector and hot pad. As illustrated in FIG. 4, the pan/pot protector and hot pad 100 includes a first compound fabric 110, a second compound fabric 120, and a side fabric 140.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second compound fabric 120 may be constructed of layers of non-abrasive, durable fabric (123 and 129) with an insulative batting (thermal barrier) 126 between the layers of non-abrasive, durable fabric (123 and 129). The second compound fabric 120 may have a square shape, a circular shape, a triangular shape, or any other shape that effectively provides a volume for receiving a pot/pan and/or covering for protecting the pot/pan.

In an alternative embodiment, the first compound fabric 110 is constructed of layers of non-abrasive, durable fabric (113 and 119) with an insulative batting (thermal barrier) 116 between the layers of non-abrasive, durable fabric (113 and 119), and the second compound fabric 120 is constructed of a thick layer of non-abrasive, durable fabric or layers of non-abrasive, durable fabric (123 and 129) with no insulative batting (thermal barrier) therebetween.

With respect to describing the pan/pot protector and hot pad 100 of FIG. 4, the description of the pan/pot protector and hot pad 100 assumes that the first compound fabric 110 and the second compound fabric 120 have a square shape and the first compound fabric 110 and the second compound fabric 120 each have four edges, wherein three of the edges are sewn (attached) to side fabric 140.

As illustrated in FIG. 4, a second side edge of the first compound fabric 110 and a second side edge of the second compound fabric 120 are attached together by the side fabric 140 to form a corner (not shown), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Additionally, as illustrated in FIG. 4, a first side edge of the first compound fabric 110 and a first side edge of the second compound fabric 120 are attached together by the side fabric 140 to form a corner (not shown)), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Lastly, as illustrated in FIG. 4, a front side edge of the first compound fabric 110 and a front side edge the second compound fabric 120 are not connected to provide an opening 160 for inserting a pot/pan into a volume of the pan/pot protector and hot pad 100.

Figure 5:
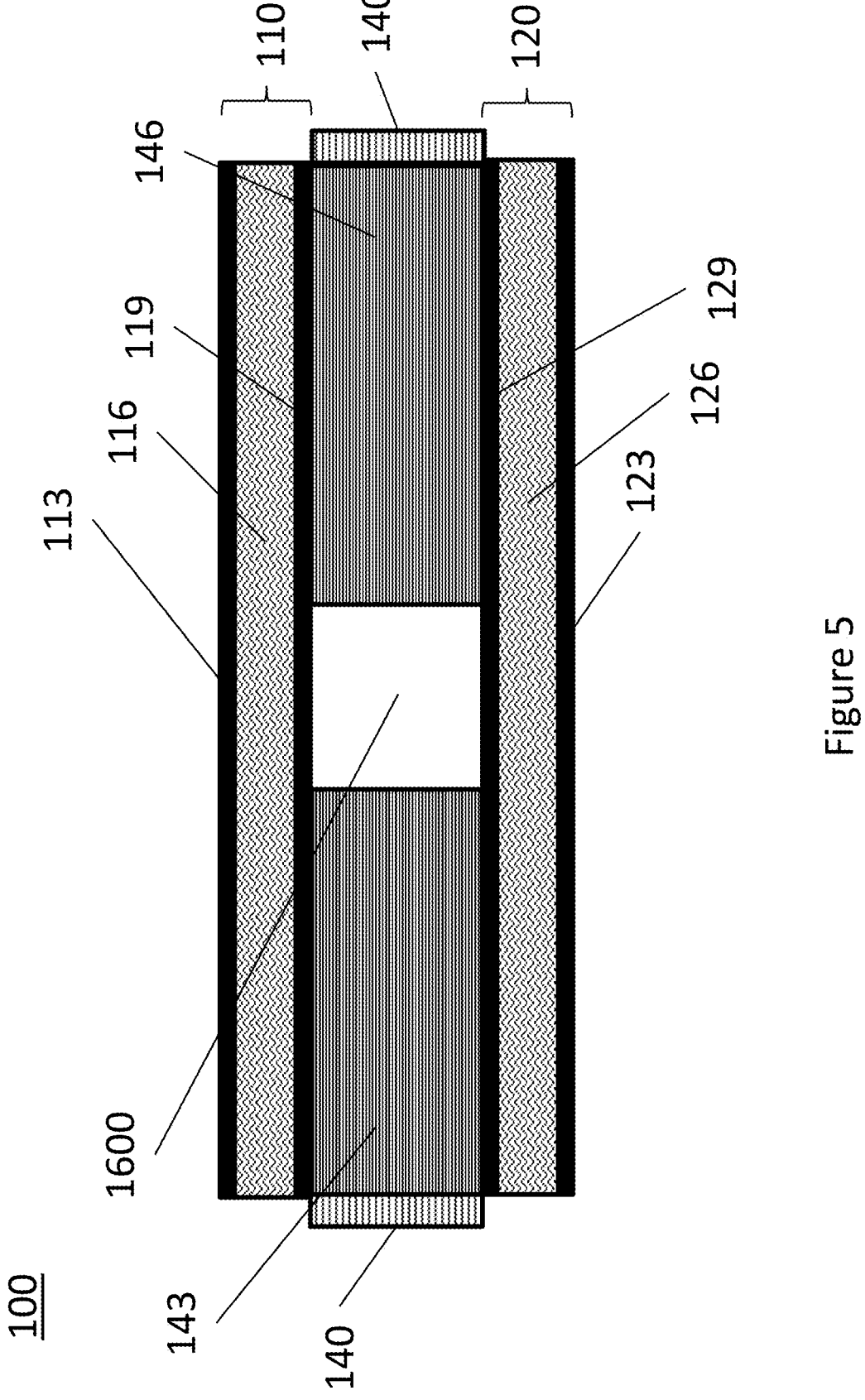
FIG. 5 illustrates a front view of another embodiment of an expanded pan/pot protector and hot pad.

FIG. 5 illustrates a front view of another embodiment of an expanded pan/pot protector and hot pad. As illustrated in FIG. 5, the pan/pot protector and hot pad 100 includes a first compound fabric 110, a second compound fabric 120, and a side fabric 140.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second compound fabric 120 may be constructed of layers of non-abrasive, durable fabric (123 and 129) with an insulative batting (thermal barrier) 126 between the layers of non-abrasive, durable fabric (123 and 129). The second compound fabric 120 may have a square shape, a circular shape, a triangular shape, or any other shape that effectively provides a volume for receiving a pot/pan and/or covering for protecting the pot/pan.

In an alternative embodiment, the first compound fabric 110 is constructed of layers of non-abrasive, durable fabric (113 and 119) with an insulative batting (thermal barrier) 116 between the layers of non-abrasive, durable fabric (113 and 119), and the second compound fabric 120 is constructed of a thick layer of non-abrasive, durable fabric or layers of non-abrasive, durable fabric (123 and 129) with no insulative batting (thermal barrier) therebetween.

With respect to describing the pan/pot protector and hot pad 100 of FIG. 5, the description of the pan/pot protector and hot pad 100 assumes that the first compound fabric 110 and the second compound fabric 120 have a square shape and the first compound fabric 110 and the second compound fabric 120 each have four edges, wherein three of the edges are sewn (attached) to side fabric 140.

As illustrated in FIG. 5, a second side edge of the first compound fabric 110 and a second side edge of the second compound fabric 120 are attached together by the side fabric 140 to form a corner (not shown), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Additionally, as illustrated in FIG. 5, a first side edge of the first compound fabric 110 and a first side edge of the second compound fabric 120 are attached together by the side fabric 140 to form a corner (not shown). The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Lastly, as illustrated in FIG. 5, a front side edge of the first compound fabric 110 and a front side edge the second compound fabric 120 are connected together by a first extension 143 of the side fabric 140, to form a corner (not shown), wherein a corner is defined as a directional transition of the surface of the pan/pot protector and hot pad 100, and a second extension 146 of the side fabric 140, to form a corner (not shown), wherein a corner is defined as a directional transition of the surface of the pan/pot protector and hot pad 100, to provide an expandable opening 160 for inserting a pot/pan into a volume of the pan/pot protector and hot pad 100.

Figure 6:
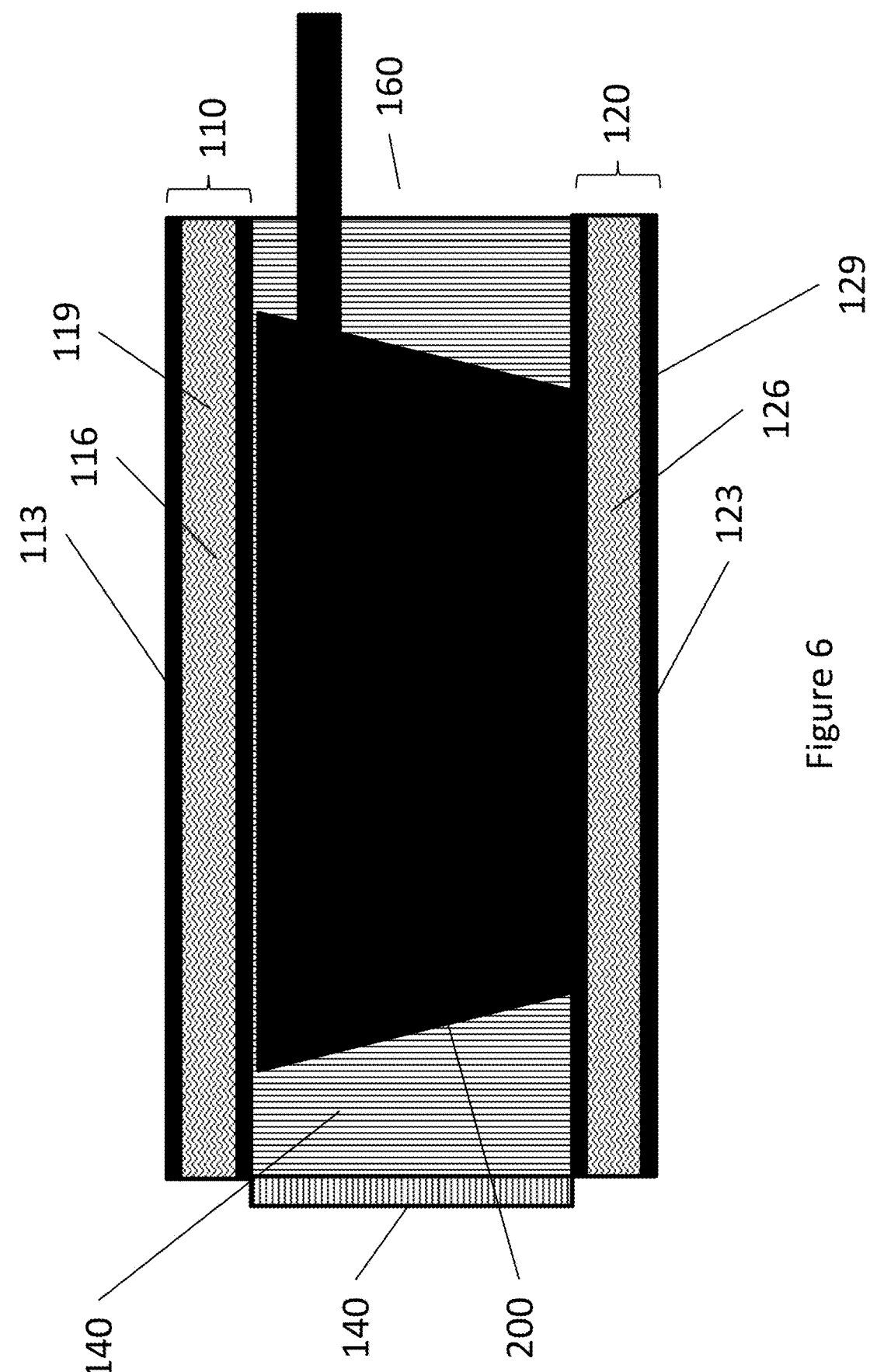
FIG. 6 illustrates the first side view of the expanded pan/pot protector and hot pad of FIG. 1 with a pan therein.

FIG. 6 illustrates a first side view of the expanded pan/pot protector and hot pad of FIG. 1 with a pan therein. As illustrated in FIG. 6, the pan/pot protector and hot pad 100 includes a first compound fabric 110, a second compound fabric 120, a side fabric 140, and an opening 160 configured to receive a pot/pan.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second compound fabric 120 may be constructed of layers of non-abrasive, durable fabric (123 and 129) with an insulative batting (thermal barrier) 126 between the layers of non-abrasive, durable fabric (123 and 129). The second compound fabric 120 may have a square shape, a circular shape, a triangular shape, or any other shape that effectively provides a volume for receiving a pot/pan and/or covering for protecting the pot/pan.

In an alternative embodiment, the first compound fabric 110 is constructed of layers of non-abrasive, durable fabric (113 and 119) with an insulative batting (thermal barrier) 116 between the layers of non-abrasive, durable fabric (113 and 119), and the second compound fabric 120 is constructed of a thick layer of non-abrasive, durable fabric or layers of non-abrasive, durable fabric (123 and 129) with no insulative batting (thermal barrier) therebetween.

With respect to describing the pan/pot protector and hot pad 100 of FIG. 6, the description of the pan/pot protector and hot pad 100 assumes that the first compound fabric 110 and the second compound fabric 120 have a square shape and the first compound fabric 110 and the second compound fabric 120 each have four edges, wherein three of the edges are sewn (attached) to side fabric 140.

As illustrated in FIG. 6, a back edge of the first compound fabric 110 and a back edge of the second compound fabric 120 are attached together by side fabric 140 to form a corner (not shown), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Further, as illustrated in FIG. 6, a first side edge of the first compound fabric 110 and a first side edge the second compound fabric 120 are attached together by the side fabric 140 to form a corner (not shown), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan 200.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Figure 7:
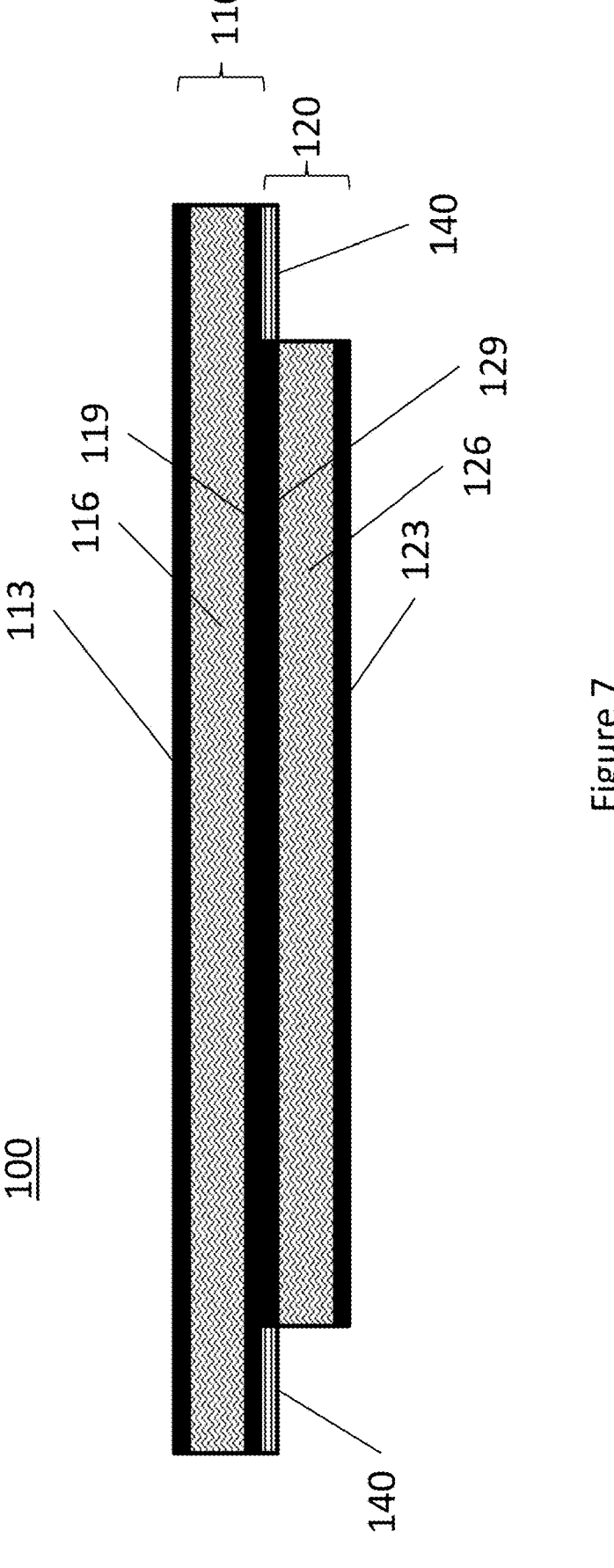
FIG. 7 illustrates a back view of a flattened pan/pot protector and hot pad.

FIG. 7 illustrates a back view of a flattened pan/pot protector and hot pad. As illustrated in FIG. 7, the pan/pot protector and hot pad 100 includes a first compound fabric 110, a second compound fabric 120, and a side fabric 140.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second compound fabric 120 may be constructed of layers of non-abrasive, durable fabric (123 and 129) with an insulative batting (thermal barrier) 126 between the layers of non-abrasive, durable fabric (123 and 129). The second compound fabric 120 may have a square shape, a circular shape, a triangular shape, or any other shape that effectively provides a volume for receiving a pot/pan and/or covering for protecting the pot/pan.

In an alternative embodiment, the first compound fabric 110 is constructed of layers of non-abrasive, durable fabric (113 and 119) with an insulative batting (thermal barrier) 116 between the layers of non-abrasive, durable fabric (113 and 119), and the second compound fabric 120 is constructed of a thick layer of non-abrasive, durable fabric or layers of non-abrasive, durable fabric (123 and 129) with no insulative batting (thermal barrier) therebetween.

With respect to describing the pan/pot protector and hot pad 100 of FIG. 7, the description of the pan/pot protector and hot pad 100 assumes that the first compound fabric 110 and the second compound fabric 120 have a square shape and the first compound fabric 110 and the second compound fabric 120 each have four edges, wherein three of the edges are sewn (attached) to side fabric 140.

As illustrated in FIG. 7, a second side edge of the first compound fabric 110 and a second side edge of the second compound fabric 120 are attached together by the side fabric 140 to form a corner (not shown), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Additionally, as illustrated in FIG. 7, a first side edge of the first compound fabric 110 and a first side edge of the second compound fabric 120 are attached together by the side fabric 140 to form a corner (not shown), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Lastly, the first compound fabric 110 is larger than the second compound fabric 120 such that when the pan/pot protector and hot pad 100 does not hold a pot/pan, the pan/pot protector and hot pad 100 can lay flat to function as a hot pad. Moreover, the configuration illustrated in FIG. 7 is more conducive to a circular shaped pot/pan. In this embodiment, the side fabric 140 is located under and parallel to the layer of non-abrasive, durable fabric 119 of the first compound fabric 110.

Figure 8:
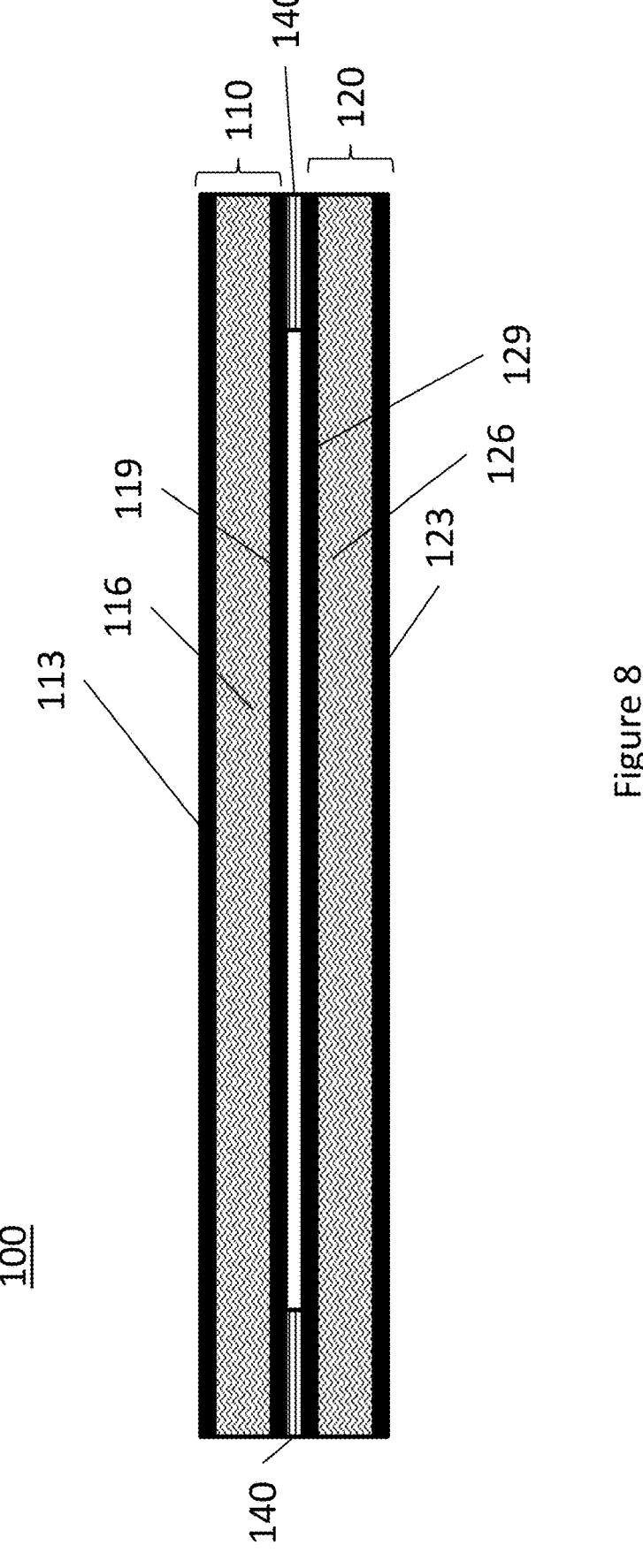
FIG. 8 illustrates a back view of another embodiment of a flattened pan/pot protector and hot pad.

FIG. 8 illustrates a back view of another embodiment of a flattened pan/pot protector and hot pad. As illustrated in FIG. 8, the pan/pot protector and hot pad 100 includes a first compound fabric 110, a second compound fabric 120, and a side fabric 140.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second compound fabric 120 may be constructed of layers of non-abrasive, durable fabric (123 and 129) with an insulative batting (thermal barrier) 116 between the layers of non-abrasive, durable fabric (123 and 129). The second compound fabric 120 may have a square shape, a circular shape, a triangular shape, or any other shape that effectively provides a volume for receiving a pot/pan and/or covering for protecting the pot/pan.

In an alternative embodiment, the first compound fabric 110 is constructed of layers of non-abrasive, durable fabric (113 and 119) with an insulative batting (thermal barrier) 116 between the layers of non-abrasive, durable fabric (113 and 119), and the second compound fabric 120 is constructed of a thick layer of non-abrasive, durable fabric or layers of non-abrasive, durable fabric (123 and 129) with no insulative batting (thermal barrier) therebetween.

With respect to describing the pan/pot protector and hot pad 100 of FIG. 8, the description of the pan/pot protector and hot pad 100 assumes that the first compound fabric 110 and the second compound fabric 120 have a square shape and the first compound fabric 110 and the second compound fabric 120 each have four edges, wherein three of the edges are sewn (attached) to side fabric 140.

As illustrated in FIG. 8, a second side edge of the first compound fabric 110 and a second side edge of the second compound fabric 120 are attached together by the side fabric

140 to form a corner (not shown), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Additionally, as illustrated in FIG. 8, a first side edge of the first compound fabric 110 and a first side edge of the second compound fabric 120 are attached together by the side fabric 140 to form a corner (not shown), wherein a corner is defined as a directional transition of the surface of the pan/pot protector and hot pad 100. The side fabric 140 is configured to allow the first compound fabric 110 to separate from the second compound fabric 120 to provide a volume for receiving a pot/pan.

It is noted that the side fabric 140 may be constructed of an elastic material to allow the first compound fabric 110 to separate from the second compound fabric 120 to provide a volume for receiving a pot/pan and bias the first compound fabric 110 and the second compound fabric 120 together when not providing a volume for receiving a pot/pan.

Lastly, the first compound fabric 110 is the same size as the compound fabric 120 such that when the pan/pot protector and hot pad 100 does not hold a pot/pan, the pan/pot protector and hot pad 100 can lay flat to function as a hot pad. Moreover, the configuration illustrated in FIG. 8 is more conducive to a square or rectangular shaped pot/pan.

In this embodiment, the side elastic fabric 140 is located between the first compound fabric 110 and second compound fabric 120.

Figure 9:
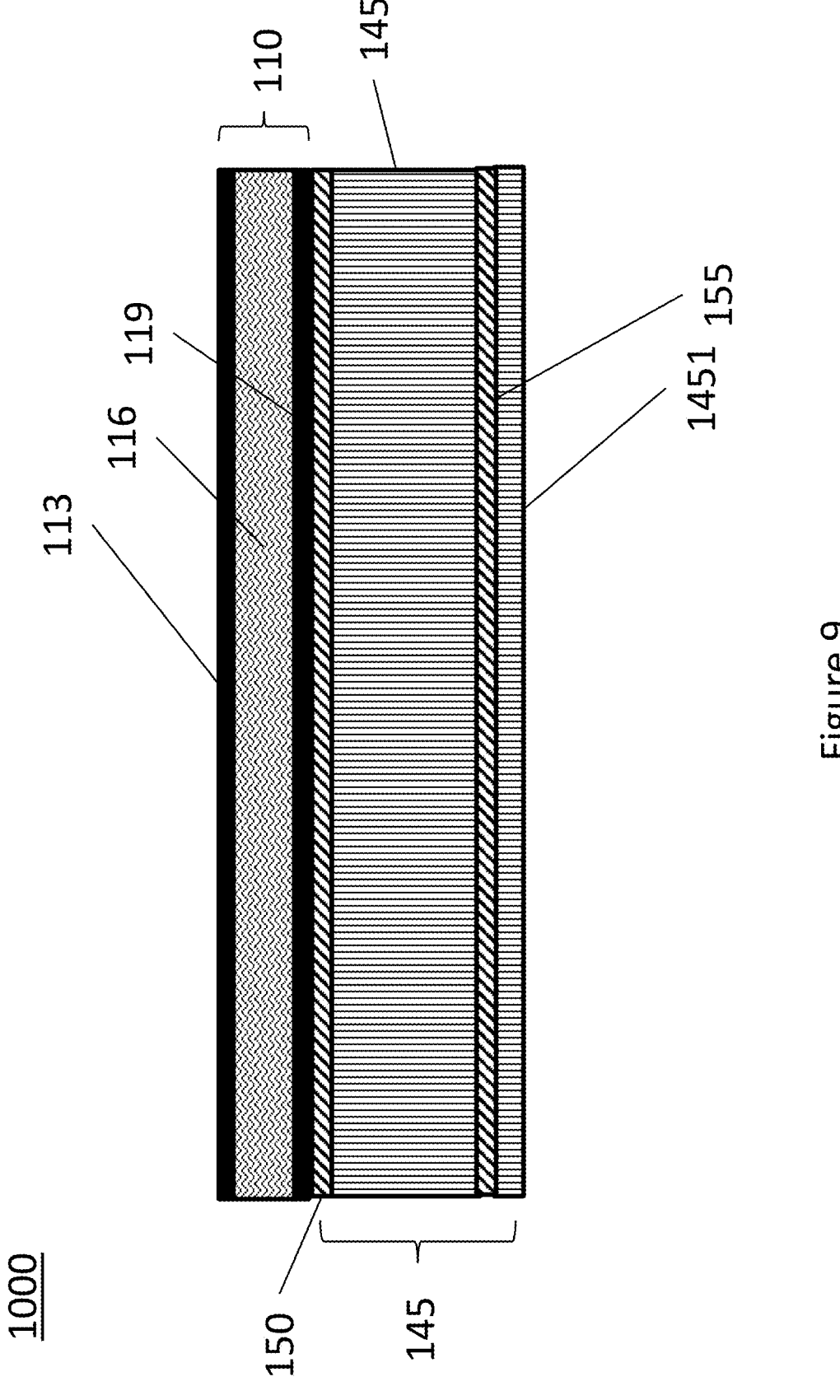
FIG. 9 illustrates a first side view of another embodiment of an expanded pan/pot protector and hot pad.

FIG. 9 illustrates a first side view of another embodiment of an expanded pan/pot protector and hot pad. As illustrated in FIG. 9, the pan/pot protector and hot pad 1000 includes a first compound fabric 110 and a second fabric 145.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second fabric 145 may be constructed of a thick layer of non-abrasive, durable fabric or layers of non-abrasive, durable fabric with no insulative batting (thermal barrier) therebetween.

With respect to describing the pan/pot protector and hot pad 1000 of FIG. 9, the description of the pan/pot protector and hot pad 1000 assumes that the first compound fabric 110 and the second fabric 145 have a square shape and the first compound fabric 110 and the second fabric 145 each have four edges, wherein three of the edges are sewn (attached) together.

As illustrated in FIG. 9, a first edge of the first compound fabric 110 and a first edge of the second fabric 145 are attached together to form a corner 150, wherein a corner is defined as a directional transition of the surface of the pan/pot protector and hot pad 1000. The second fabric 145 has a sewn in corner 155, wherein a corner is defined as a directional transition of the surface of the pan/pot protector and hot pad 1000, to create a first side portion 1452 and a second side portion 1451, which allows the first compound fabric 110 to separate from the second side portion 1451 to provide a volume for receiving a pot/pan.

Figure 10:
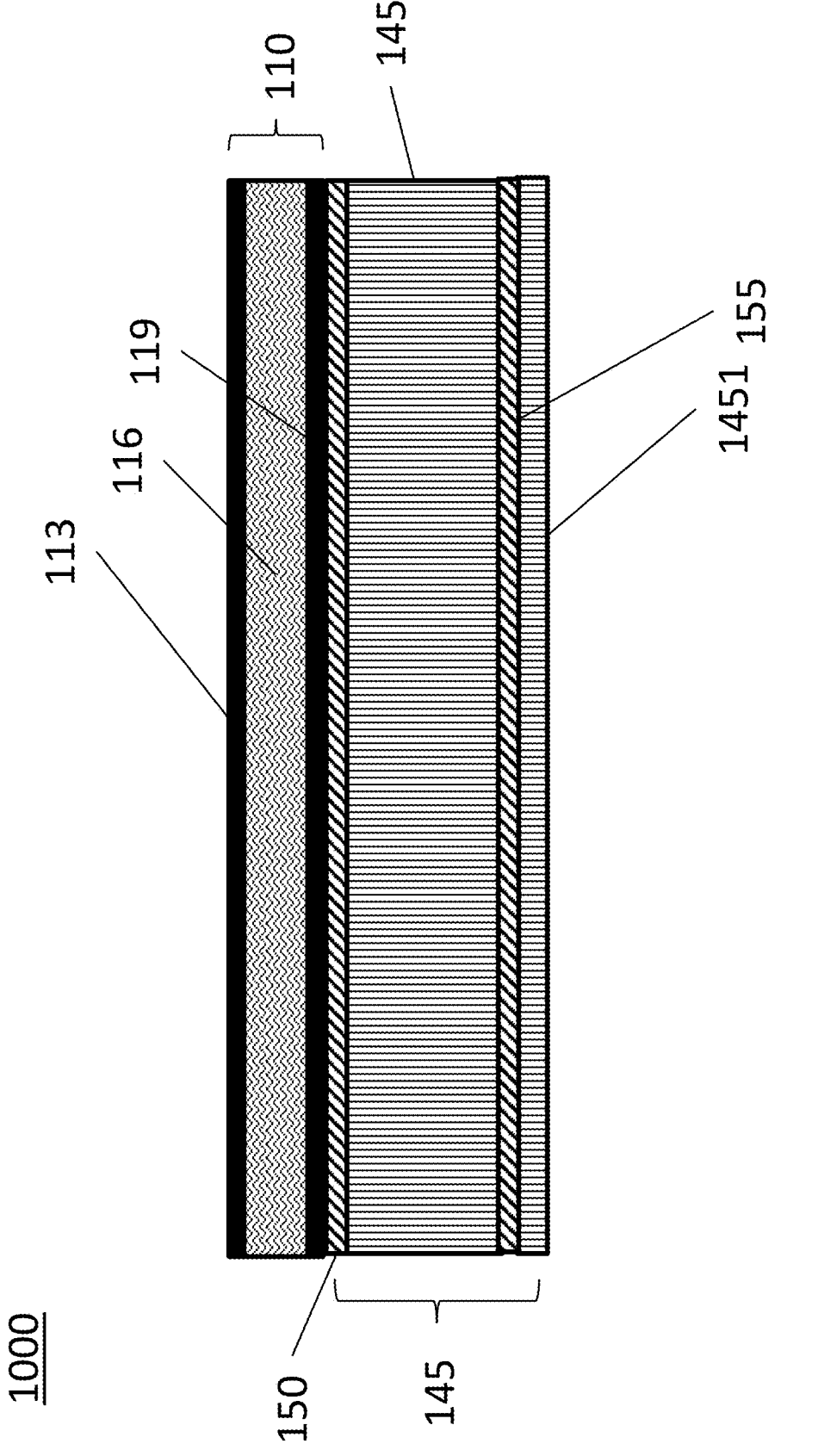
FIG. 10 illustrates a second side view of another embodiment of an expanded pan/pot protector and hot pad.

FIG. 10 illustrates a second side view of another embodiment of an expanded pan/pot protector and hot pad. As illustrated in FIG. 10, the pan/pot protector and hot pad 1000 includes a first compound fabric 110 and a second fabric 145.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second fabric 145 may be constructed of a thick layer of non-abrasive, durable fabric or layers of non-abrasive, durable fabric with no insulative batting (thermal barrier) therebetween.

With respect to describing the pan/pot protector and hot pad 1000 of FIG. 10, the description of the pan/pot protector and hot pad 1000 assumes that the first compound fabric 110 and the second fabric 145 have a square shape and the first compound fabric 110 and the second fabric 145 each have four edges, wherein three of the edges are sewn (attached) together.

As illustrated in FIG. 10, a second edge of the first compound fabric 110 and a second edge of the second fabric 145 are attached together to form a corner 150, wherein a corner is defined as a directional transition of the surface of the pan/pot protector and hot pad 1000. The second fabric 145 has a sewn in corner 155, wherein a corner is defined as a directional transition of the surface of the pan/pot protector and hot pad 1000, to create a third side portion 1453 and second side portion 1451 which allows the first compound fabric 110 to separate from the second side portion 1451 to provide a volume for receiving a pot/pan.

Figure 11:
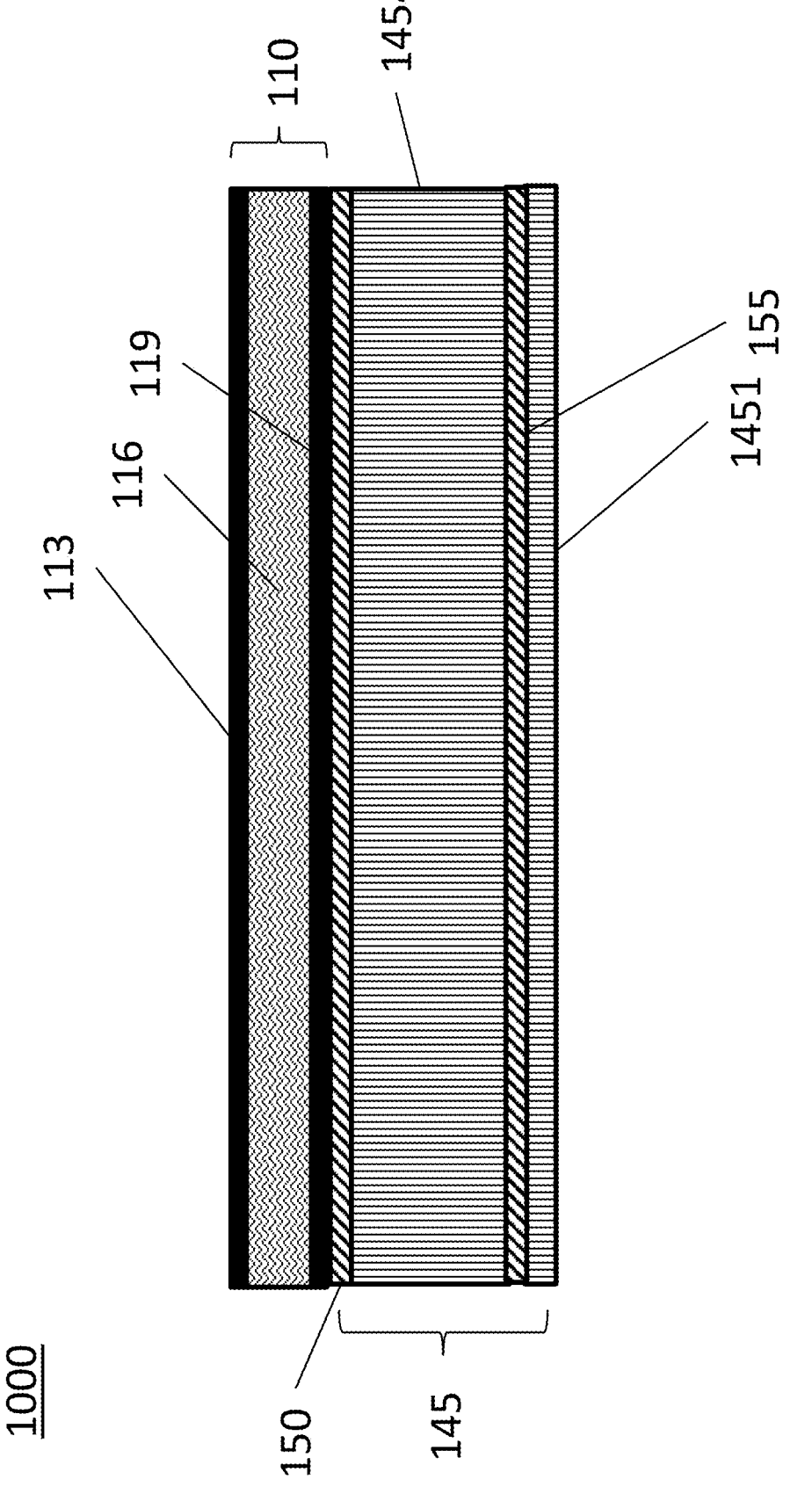
FIG. 11 illustrates a back side view of another embodiment of an expanded pan/pot protector and hot pad.

FIG. 11 illustrates a back side view of another embodiment of an expanded pan/pot protector and hot pad. As illustrated in FIG. 11, the pan/pot protector and hot pad 1000 includes a first compound fabric 110 and a second fabric 145.

The first compound fabric 110 may be constructed of layers of non-abrasive, durable fabric (113 and 119) with an insulative batting (thermal barrier) 116 between the layers of non-abrasive, durable fabric (113 and 119). The first compound fabric 110 may have a square shape, a circular shape, a triangular shape, or any other shape that effectively provides a volume for receiving a pot/pan and/or covering for protecting the pot/pan.

The second fabric 145 may be constructed of a thick layer of non-abrasive, durable fabric or layers of non-abrasive, durable fabric with no insulative batting (thermal barrier) therebetween.

With respect to describing the pan/pot protector and hot pad 1000 of FIG. 11, the description of the pan/pot protector and hot pad 1000 assumes that the first compound fabric 110 and the second fabric 145 have a square shape and the first compound fabric 110 and the second fabric 145 each have four edges, wherein three of the edges are sewn (attached) together.

As illustrated in FIG. 11, a back edge of the first compound fabric 110 and a back edge of the second fabric 145 are attached together to form a corner 150, wherein a corner is defined as a directional transition of the surface of the pan/pot protector and hot pad 1000. The second fabric 145 has a sewn in corner 155, wherein a corner is defined as a directional transition of the surface of the pan/pot protector and hot pad 1000, to create a fourth side portion 1454 and second side portion 1451, which allows the first compound fabric 110 to separate from the second side portion 1451 to provide a volume for receiving a pot/pan.

Figure 12:
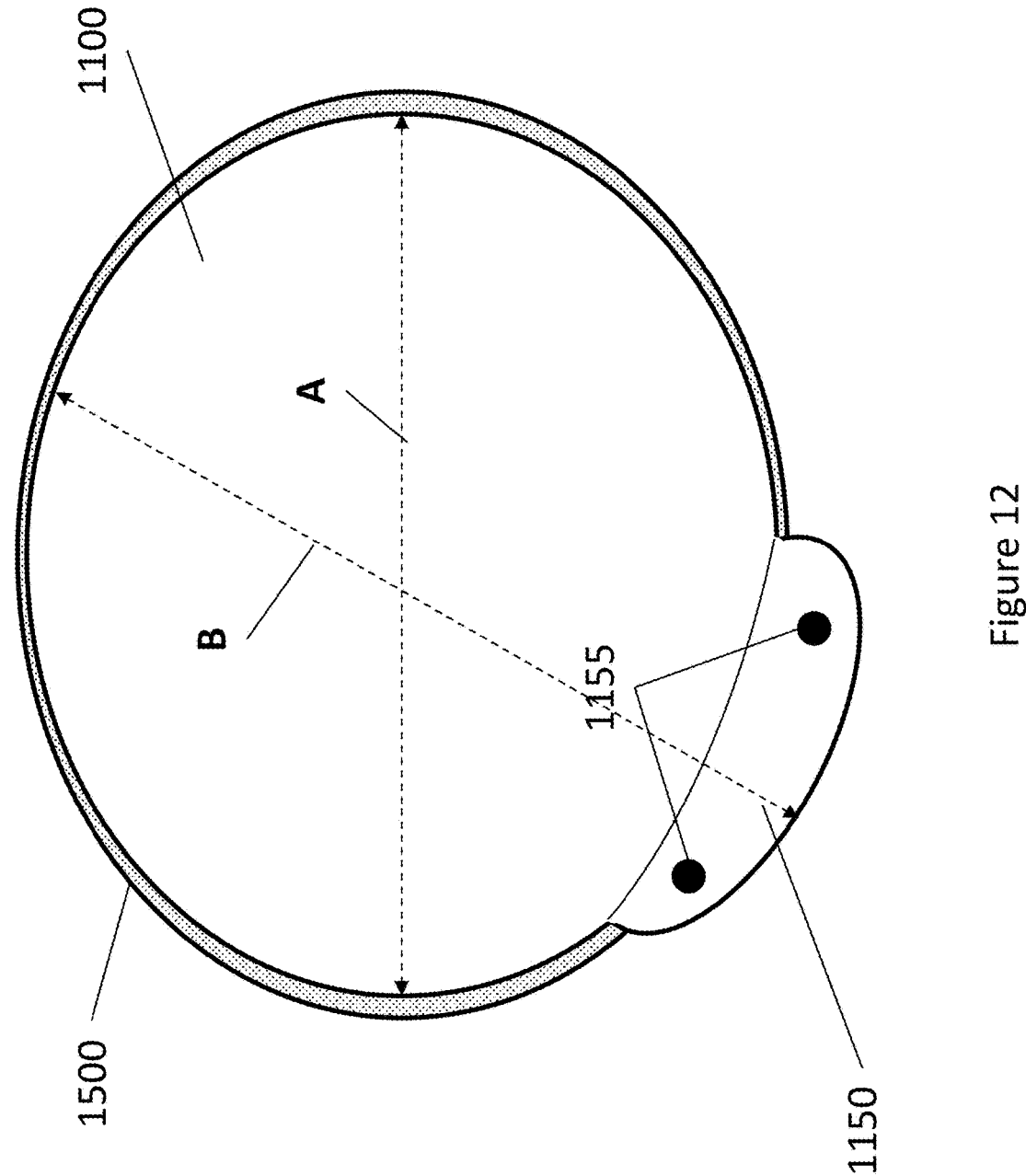
FIG. 12 illustrates a top view of another embodiment of a pan/pot protector and hot pad for a circular shaped pan/pot.

FIG. 12 illustrates a top view of another embodiment of a pan/pot protector and hot pad for a circular shaped pan/pot. As illustrated in FIG. 12, a pan/pot protector and hot pad 2000 includes a first fabric 1100. The first fabric 1100 has a corner 1500 formed by attaching (via sewing) the first fabric 1100 to a second fabric (not shown), wherein a corner is defined as a directional transition of the surface of the pan/pot protector and hot pad 2000.

The first fabric 1100 has a diameter A which allows the first fabric 1100 to cover a top portion of a circular shaped pan/pot.

The first fabric 1100 may be constructed of layers of non-abrasive, durable fabric with an insulative batting (thermal barrier) between the layers of non-abrasive, durable fabric.

The first fabric 1100 also includes an attachment extension portion 1150 that includes attachment mechanisms 1155, such as snaps or Velcro™ for attaching to corresponding attachment mechanisms (not shown) on the second fabric (not shown).

The configuration of the attachment extension portion 1150 is such that a diameter B of the first fabric 1100, which includes the attachment extension portion 1150, is larger than diameter A.

The second fabric (not shown) may be constructed of a thick layer of non-abrasive, durable fabric or layers of non-abrasive, durable fabric with no insulative batting (thermal barrier) therebetween.

The second fabric (not shown) may also be constructed of layers of non-abrasive, durable fabric with an insulative batting (thermal barrier) between the layers of non-abrasive, durable fabric.

It is noted that the first fabric 1100 and the second fabric (not shown) may be a continuous fabric with the corner 1500, wherein a corner is defined as a directional transition of the surface of the pan/pot protector and hot pad 2000, sewn into the continuous fabric.

Figure 13:
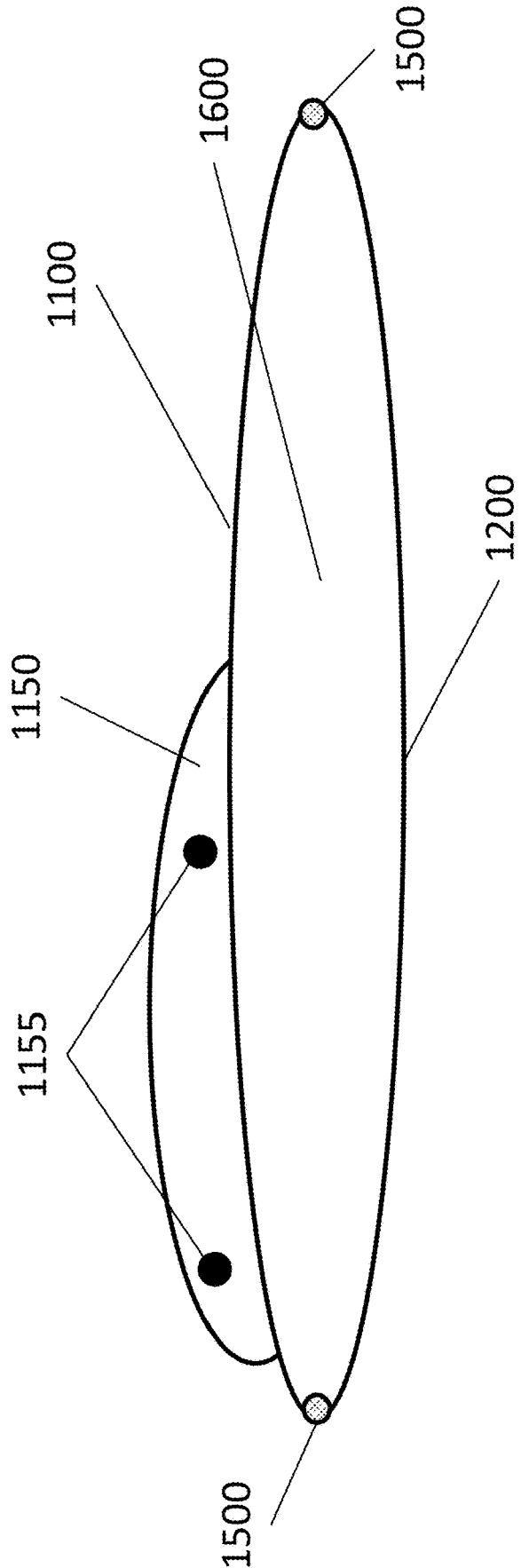
FIG. 13 illustrates an open state of the embodiment of FIG. 12.

FIG. 13 illustrates an open state of the embodiment of FIG. 12. As illustrated in FIG. 13, a pan/pot protector and hot pad 2000 includes a first fabric 1100 and a second fabric 1200. The pan/pot protector and hot pad 2000 has a corner 1500, wherein a corner is defined as a directional transition of the surface of the pan/pot protector and hot pad 2000, formed by attaching (via sewing) the first fabric 1100 to a second fabric 1200.

However, the corner 1500 does not circumvent the entire border of the first fabric 1100 and the second fabric 1200, thereby creating an opening 1600. The opening is configured to receive a pan/pot into a volume created by the first fabric 1100 and the second fabric 1200.

The first fabric 1100 may be constructed of layers of non-abrasive, durable fabric with an insulative batting (thermal barrier) between the layers of non-abrasive, durable fabric.

The first fabric 1100 also includes an attachment extension portion 1150 that includes attachment mechanisms 1155, such as snaps or Velcro™ for attaching to corresponding attachment mechanisms (not shown) on the second fabric 1200.

The second fabric 1200 may be constructed of a thick layer of non-abrasive, durable fabric or layers of non-abrasive, durable fabric with no insulative batting (thermal barrier) therebetween.

The second fabric 1200 may also be constructed of layers of non-abrasive, durable fabric with an insulative batting (thermal barrier) between the layers of non-abrasive, durable fabric.

It is noted that the first fabric 1100 and the second fabric 1200 may be a continuous fabric with the corner 1500 sewn into the continuous fabric.

Figure 14:
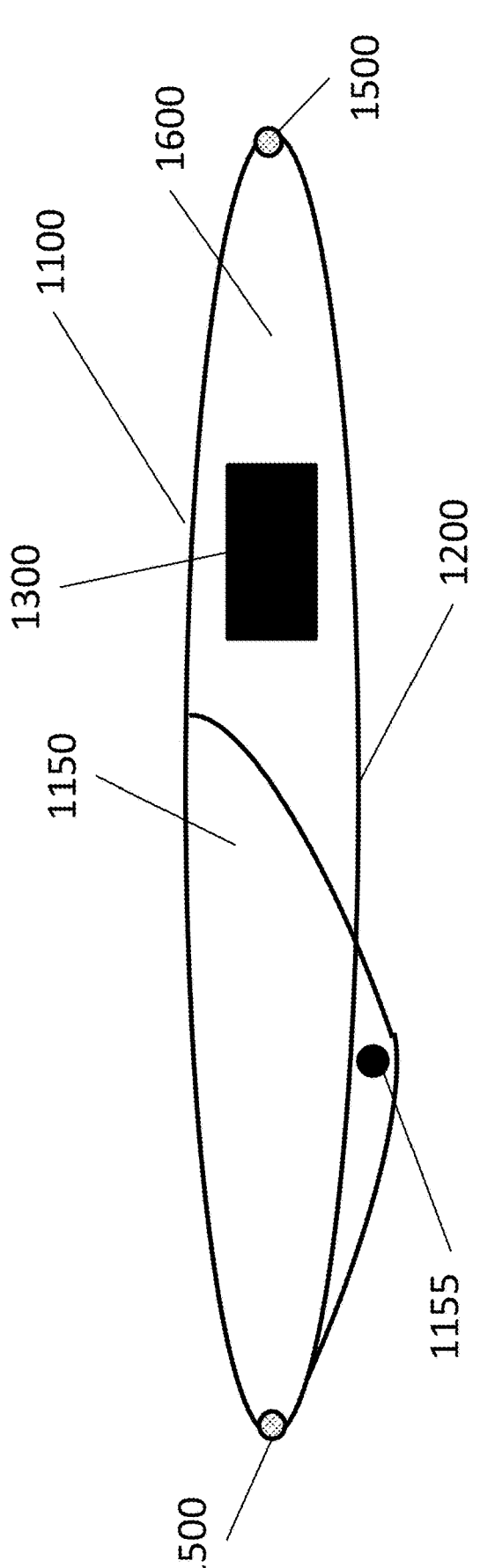
FIG. 14 Illustrates a closed state of the embodiment of FIG. 12.

FIG. 14 Illustrates a closed state of the embodiment of FIG. 12. As illustrated in FIG. 14, a pan/pot protector and hot pad 2000 includes a first fabric 1100 and a second fabric 1200. The pan/pot protector and hot pad 2000 has a corner 1500, wherein a corner is defined as a directional transition of the surface of the pan/pot protector and hot pad 2000, formed by attaching (via sewing) the first fabric 1100 to a second fabric 1200.

However, the corner 1500 does not circumvent the entire border of the first fabric 1100 and the second fabric 1200, thereby creating an opening 1600. The opening is configured to receive a pan/pot into a volume created by the first fabric 1100 and the second fabric 1200.

The first fabric 1100 may be constructed of layers of non-abrasive, durable fabric with an insulative batting (thermal barrier) between the layers of non-abrasive, durable fabric.

The first fabric 1100 also includes an attachment extension portion 1150 that includes attachment mechanisms 1155, such as snaps or Velcro™ for attaching to corresponding attachment mechanisms (not shown) on the second fabric 1200.

As illustrated in FIG. 14, the attachment mechanisms 1155 are attached to the corresponding attachment mechanisms (not shown) on the second fabric 1200 such that a portion of the opening 1600 is closed. The resulting size of opening 1600 is such that a pan/pot handle 1300 can pass therethrough, thereby securing a pan/pot within the pan/pot protector and hot pad 2000.

The second fabric 1200 may be constructed of a thick layer of non-abrasive, durable fabric or layers of non-abrasive, durable fabric with no insulative batting (thermal barrier) therebetween.

The second fabric 1200 may also be constructed of layers of non-abrasive, durable fabric with an insulative batting (thermal barrier) between the layers of non-abrasive, durable fabric.

It is noted that the first fabric 1100 and the second fabric 1200 may be a continuous fabric with the corner 1500, wherein a corner is defined as a directional transition of the surface of the pan/pot protector and hot pad 2000, sewn into the continuous fabric.

A pan/pot protector and hot pad includes a first compound fabric constructed of a first layer of non-abrasive, durable fabric, a second layer of non-abrasive, durable fabric, and a first insulative thermal barrier batting located between the first and second layers of non-abrasive, durable fabric; and a second compound fabric constructed of a third layer of non-abrasive, durable fabric, a fourth layer of non-abrasive, durable fabric, and a second insulative thermal barrier batting located between the third and fourth layers of non-abrasive, durable fabric; the first compound fabric being operatively attached to the second compound fabric; the attachment of the first compound fabric and the second compound fabric being configured to have a shape to effectively provide a volume for receiving and protectively covering an entire pot/pan.

The attachment of the first compound fabric and the second compound fabric may be configured to have the first compound fabric and the second compound fabric to be substantially flat when not receiving and protectively covering an entire pot/pan.

A pan/pot protector and hot pad includes a first compound fabric constructed of a first layer of non-abrasive, durable fabric, a second layer of non-abrasive, durable fabric, and a first insulative thermal barrier batting located between the first and second layers of non-abrasive, durable fabric; a second compound fabric constructed of a third layer of non-abrasive, durable fabric, a fourth layer of non-abrasive, durable fabric, and a second insulative thermal barrier batting located between the third and fourth layers of non-abrasive, durable fabric; and a side fabric; the first compound fabric having edges around a perimeter/circumference of the first compound fabric; the second compound fabric having edges around a perimeter/circumference of the second compound fabric; the side fabric being operatively attached to a first portion of the edges of the first compound fabric and a first portion of the edges of the second compound fabric; the attachment of the first portion of the edges of the first compound fabric and the first portion of the edges of the second compound fabric to the side fabric being configured to have a shape to effectively provide a volume for receiving and protectively covering an entire pot/pan.

The attachment of the first portion of the edges of the first compound fabric and the first portion of the edges of the second compound fabric to the side fabric may be configured to have the first compound fabric and the second compound fabric to be substantially flat when not receiving and protectively covering an entire pot/pan.

The attachment of the first portion of the edges of the first compound fabric and the first portion of the edges of the second compound fabric to the side fabric may be configured to have the side fabric fold upon itself such that the first compound fabric and the second compound fabric are substantially flat when not receiving and protectively covering an entire pot/pan.

A pan/pot protector and hot pad includes a first fabric constructed of a first layer of non-abrasive, durable fabric, a second layer of non-abrasive, durable fabric, and a first insulative thermal barrier batting located between the first and second layers of non-abrasive, durable fabric; a second fabric constructed of a layer of non-abrasive, durable fabric; and a side fabric; the first fabric having edges around a perimeter/circumference of the first fabric; the second fabric having edges around a perimeter/circumference of the second fabric; the side fabric being operatively attached to a first portion of the edges of the first fabric and a first portion of the edges of the second fabric; the attachment of the first portion of the edges of the first fabric and the first portion of the edges of the second fabric to the side fabric being configured to have a shape to effectively provide a volume for receiving and protectively covering an entire pot/pan.

The attachment of the first portion of the edges of the first fabric and the first portion of the edges of the second fabric to the side fabric may be configured to have the first fabric and the second fabric to be substantially flat when not receiving and protectively covering an entire pot/pan.

The attachment of the first portion of the edges of the first fabric and the first portion of the edges of the second fabric to the side fabric may be configured to have the side fabric fold upon itself such that the first fabric and the second fabric are substantially flat when not receiving and protectively covering an entire pot/pan.

The pan/pot protector and hot pads, as described above, provide a protective cover for the interior and exterior surfaces of cookware, bakeware, and serveware. The pan/pot protector and hot pads act as an envelope for the cookware, bakeware, or serveware, and when in use as a protective barrier for storage, prevents scratching, abrasion, and gouges to the cooking surface when in contact with other items in the storage and/or transportation area. Cookware, bakeware, and serveware may stay securely within the pan/pot protector and hot pads by the elastic material on the sides.

It is noted that the pan/pot protector and hot pads may include an optional tab to prevent the pan/pot protector and hot pad from being removed when the cookware, bakeware, or serveware is being transported or stacked with other containers.

When the cookware, bakeware, or serveware is in-use, the pan/pot protector and hot pads can be used as a heat barrier (hot pad) due to the inclusion of batting, an insulative barrier, in the protective layers. When the pan/pot protector and hot pads are laid flat, the hot cookware, bakeware, or serveware can be set on top of the pan/pot protector and hot pads and are therefore multi-functional when not being used as a protective cover.

It will be appreciated that variations of the above-disclosed embodiments and other features and functions, or alternatives thereof, may be desirably combined into many other different systems or applications.

Also, various presently unforeseen or unanticipated alternatives, modifications, variations, or improvements therein may be subsequently made by those skilled in the art which are also intended to be encompassed by the description above.

What is claimed is:

1. A pan/pot protector and hot pad consisting essentially of:

a first compound fabric constructed of a first layer of non-abrasive, durable fabric, a second layer of non-abrasive, durable fabric, and a first insulative thermal barrier batting located between said first and second layers of non-abrasive, durable fabric; and a second compound fabric constructed of a third layer of non-abrasive, durable fabric, a fourth layer of non-abrasive, durable fabric, and a second insulative thermal barrier batting located between said third and fourth layers of non-abrasive, durable fabric;

said first compound fabric being operatively attached to said second compound fabric;

said attachment of said first compound fabric and said second compound fabric being configured to have a shape to effectively provide a volume for receiving and protectively covering an entire pot/pan.

2. The pan/pot protector and hot pad, as claimed in claim 1, wherein said attachment of said first compound fabric and said second compound fabric is configured to have said first compound fabric and said second compound fabric to be substantially flat when not receiving and protectively covering the entire pot/pan.

3. A pan/pot protector and hot pad consisting essentially of:

a first compound fabric constructed of a first layer of non-abrasive, durable fabric, a second layer of non-abrasive, durable fabric, and a first insulative thermal barrier batting located between said first and second layers of non-abrasive, durable fabric;

a second compound fabric constructed of a third layer of non-abrasive, durable fabric, a fourth layer of non-abrasive, durable fabric, and a second insulative thermal barrier batting located between said third and fourth layers of non-abrasive, durable fabric; and a side fabric;

said first compound fabric having edges around a perimeter/circumference of said first compound fabric;

said second compound fabric having edges around a perimeter/circumference of said second compound fabric;

said side fabric being operatively attached to a first portion of said edges of said first compound fabric and a first portion of said edges of said second compound fabric;

said attachment of said first portion of said edges of said first compound fabric and said first portion of said edges of said second compound fabric to said side fabric being configured to have a shape to effectively provide a volume for receiving and protectively covering an entire pot/pan.

4. The pan/pot protector and hot pad, as claimed in claim 3, wherein said attachment of said first portion of said edges of said first compound fabric and said first portion of said edges of said second compound fabric to said side fabric is configured to have said first compound fabric and said second compound fabric to be substantially flat when not receiving and protectively covering the entire pot/pan.

5. The pan/pot protector and hot pad, as claimed in claim 3, wherein said attachment of said first portion of said edges of said first compound fabric and said first portion of said edges of said second compound fabric to said side fabric is configured to have said side fabric fold upon itself such that said first compound fabric and said second compound fabric are substantially flat when not receiving and protectively covering the entire pot/pan.

6. The pan/pot protector and hot pad, as claimed in claim 4, wherein said attachment of said first portion of said edges of said first compound fabric and said first portion of said edges of said second compound fabric to said side fabric is configured to have said side fabric fold upon itself such that said first compound fabric and said second compound fabric are substantially flat when not receiving and protectively covering the entire pot/pan.

7. A pan/pot protector and hot pad consisting essentially of:

a first fabric constructed of a first layer of non-abrasive, durable fabric, a second layer of non-abrasive, durable fabric, and a first insulative thermal barrier batting located between said first and second layers of non-abrasive, durable fabric;

a second fabric constructed of a layer of non-abrasive, durable fabric; and a side fabric;

said first fabric having edges around a perimeter/circumference of said first fabric;

said second fabric having edges around a perimeter/circumference of said second fabric;

said side fabric being operatively attached to a first portion of said edges of said first fabric and a first portion of said edges of said second fabric;

said attachment of said first portion of said edges of said first fabric and said first portion of said edges of said second fabric to said side fabric being configured to have a shape to effectively provide a volume for receiving and protectively covering an entire pot/pan.

8. The pan/pot protector and hot pad, as claimed in claim 7, wherein said attachment of said first portion of said edges of said first fabric and said first portion of said edges of said second fabric to said side fabric is configured to have said first fabric and said second fabric to be substantially flat when not receiving and protectively covering the entire pot/pan.

9. The pan/pot protector and hot pad, as claimed in claim 7, wherein said attachment of said first portion of said edges of said first fabric and said first portion of said edges of said second fabric to said side fabric is configured to have said side fabric fold upon itself such that said first fabric and said second fabric are substantially flat when not receiving and protectively covering the entire pot/pan.

10. The pan/pot protector and hot pad, as claimed in claim 8, wherein said attachment of said first portion of said edges of said first fabric and said first portion of said edges of said second fabric to said side fabric is configured to have said side fabric fold upon itself such that said first fabric and said second fabric are substantially flat when not receiving and protectively covering the entire pot/pan.

\* \* \* \* \*